Patented Oct. 24, 1950

2,527,500

UNITED STATES PATENT OFFICE 2,527,500

HIGH-TEMPERATURE CASTABLE REFRACTORIES

Charles L. Norton, Jr., New York, N. Y., and Victor J. Duplin, Jr., Fanwood, N. J., assignors to The Babcock & Wilcox Company, Rockleigh, N. J., a corporation of New Jersey No Drawing. Application July 8, 1946, Serial No. 682,158

5 Claims. (Cl. 106—64)

The present invention relates in general to the manufacture of castable refractories, and more particularly, to improvements in the composition of dry unfired refractory materials capable of use in a castable consistency to form refractories having a maximum service use temperature approximating 3000-3100 F.

It has heretofore been the practice in the construction of furnace linings where the lining is subjected to temperatures up to 3000 F., to employ heavy duty firebrick, especially for the construction of vertical walls. In service applications where the use of firebrick is impracticable, as, for example, in providing a refractory lining for furnace wall water tubes carrying metallic projections, it has been customary to use a relatively stiff mixture of a chrome ore base refractory, a binder or setting agent, and water, manually pounded or rammed into place on or between the wall tubes. The laborious and time-consuming character of such applications has resulted in high installation costs. Sodium silicate is commonly employed as a binder for the plastic refractory. It has been found that the permissible use temperature of such refractories is substantially below 3000 F., as the relatively low hot load strength of such refractory causes the applied material to slump when it is heated to a temperature approximating 3000 F. It is believed that this effect is due to the presence of uncombined low melting point non-chromite impurities in the gangue of the chrome ore. This inherent weakness has limited the locations where such plastic refractories can be effectively used. For example, it is impracticable to construct vertical furnace walls or linings with these materials and the pitch of corbels is greatly limited.

Furthermore, the sodium silicate binder employed in the mix requires that the refractory material be heated to a setting temperature fairly promptly after its installation, to avoid atmospheric moisture in the furnace chamber leaching out the sodium silicate binder. This requirement is particularly onerous in installations where firing of the furnace would be otherwise unnecessary, such as where such refractory material is used for repairs made to the furnace walls prior to laying-up a steam boiler unit for an indefinite period.

In some cases the sodium silicate binder has been replaced with a calcium aluminate hydraulic cement having the formula $5CaO.3Al_2O_3$, in view of the higher refractoriness of the latter. While a chrome ore-$5CaO.3Al_2O_3$ cement mix will provide a furnace refractory lining having a permissible use temperature higher than a chrome ore-sodium silicate mix, the improved lining is still not capable of withstanding temperatures of 3000 F. One cause of this use temperature limitation is believed to be the substantial iron oxide content of such calcium-aluminate cements, the content of FeO and $Fe_2O_3$ ranging from 13-17% by weight. The iron appears to act as a flux, causing the $SiO_2$ and $Al_2O_3$ in the mix to combine with the lime constituent at lower temperatures than would otherwise be the case.

The main object of this invention is the provision of a chrome ore base refractory material which is castable and which is capable of continuous service at use temperatures approximating 3000-3100 F. A further and more specific object is the provision of an unfired dry chrome ore base refractory mix which when mixed with water can readily be troweled on or cast against forms to form elements equal or superior in refractoriness to the firebrick used in the structure. A further specific object is the provision of a castable chrome ore base refractory which when used in a furnace location exposed to atmospheric moisture does not deteriorate between the time of installation and the first firing of the furnace regardless of when the latter occurs.

In accordance with this invention, the refractoriness, as indicated by permissible maximum use limit, of chrome ore base refractories is substantially increased and other physical properties, such as volumetric stability and hot load resistance at maximum use temperatures, greatly improved by mixing therewith a material having a high percentage of corundum and a calcium aluminate hydraulic cement in predetermined proportions, with the optional addition of a small quantity of plastic fire clay depending on the desired plasticity.

While the chrome ore base material normally contains a substantial amount of alumina ($Al_2O_3$), this alumina content is normally present as a solid solution in the spinel component of the ore and is not available for combination with the various low melting point non-chromite impurities in the gangue of the ore. The mixing of a high corundum material, such as fused or calcined alumina preferably in a finely divided form, with the dry pulverized chrome ore is believed to provide a high melting point constituent which will combine with substantially all of the low melting point impurities in the chrome ore base, and thereby substantially increase the refractoriness of the mix when fired.

The resulting substantial alumina content of the mixture of pulverized chrome ore and high corundum material appears to be particularly favorable to the use of a high temperature calcium aluminate cement as the binder. While $5CaO.3Al_2O_3$ cement has given satisfactory results in increased permissible temperature use limits, a relatively pure high alumina calcium aluminate cement, such as tri-calcium penta-aluminate $(3CaO.5Al_2O_3)$ which is free from iron oxides, permits a still higher use temperature limit and substantially low linear and volumetric shrinkage at the higher temperatures. The relative melting temperatures of $5CaO.3Al_2O_3$ cement and the described tri-calcium penta-aluminate cement, as determined by the standard cone test, are:

|  | Start | Touch | Down |
|---|---|---|---|
|  | F. | F. | F. |
| 5 CaO.3Al₂O₃ cement | 2,585 | 2,635 | 2,662 |
| Tri-calcium penta-aluminate | 3,015 | 3,085 | 3,105 |

The castable chrome ore base refractories of this invention have the following general composition by weight:

| | Per Cent |
|---|---|
| 2–8 mesh high grade chrome ore | 50–90 |
| 28 mesh or finer fused alumina, calcined alumina, gibbsite, diaspore or bauxite | 5–25 |
| 200 mesh or finer pulverized calcium aluminate cement | 5–20 |
| Plastic fire or ball clay | 0– 5 |

The materials are uniformly and thoroughly mixed in a dry condition and are adapted for use without further treatment, such as sintering and repulverizing the mix, by merely adding sufficient water, e. g. 10–15% by weight of dry materials, at the point of use to give the desired castable consistency to the mix. The amount of water to be added will depend somewhat upon the size and shape of the pieces to be cast. For a large piece, the mass should be somewhat stiff; for a small or complicated shape, a slightly wetter consistency will be desirable. In general 11.5 lbs. or 1.35 gallons of water are necessary per 100 lbs. of the dry mix. This wetted material is sufficiently fluid to be poured into forms like ordinary concrete and to be worked with a rod to fill all corners of the form or mold.

Naturally, the grade of chrome ore used as a base for the mix also plays a very important part in determining the final characteristics of the chrome castable produced. A high grade chrome ore containing more than 40% of $Cr_2O_3$ is preferred, such as a Rhodesian Imperial chrome ore which was found to have the following chemical analysis:

| | Per Cent |
|---|---|
| $SiO_2$ | 8.3 |
| FeO | 15.1 |
| $Al_2O_3$ | 15 |
| $TiO_2$ | Trace |
| MnO | 0.2 |
| CaO | Trace |
| MgO | 14.5 |
| $Cr_2O_3$ | 44.6 |
| Ignition loss | 2.5 |
| | 100.2 |

Other chrome ores of lower grade can, however, also be used either alone or in admixture with high grade ores where the desired operating conditions are not as exacting. Ores of this type run approximately 30–40% $Cr_2O_3$ and are representative of the type obtained from Cuba.

The preferred quantity of calcium aluminate cement used in the dry mix is about 10%. However, where dried or low temperature strength is not an important factor, the percentage can be reduced to about 5%. On the other hand, where unusually high molded or handling strength is desired, the percentage of cement put into the dry mix can be raised to 15%, or in some cases even 20%, of the dry batch mixture. Experience has shown that some refractoriness is lost in the material when the cement content is increased above 15%, but this is not always a prime requisite in the final product.

The corundum can be added to the mix in one of a number of forms. It may be added in the form of a finely divided fused alumina, calcined alumina, gibbsite, diaspore or bauxite. The ultimate results obtained will be substantially the same providing the total $Al_2O_3$ content of the final product after firing is substantially the same. It has, however, been found preferable to add the fused alumina in a finely divided form in order to get the best results.

It has been observed that the alumina additions appear to be most effective when the ratio of minus 35 mesh chrome ore to minus 35 mesh alumina is within the limits of .5 to 3.0. Excellent results have been obtained when this ratio has been in the neighborhood of 2.6.

The chrome castable composition which has been found to give the most satisfactory results is one which contains the following percentages by weight:

| | Per cent |
|---|---|
| 4 or 6 mesh raw Rhodesian chromite ore | 57 |
| 100 mesh raw Rhodesian chromite ore | 15 |
| 65 mesh fused alumina | 15 |
| Pulverized tri-calcium penta-aluminate cement | 10 |
| Plastic fire clay | 3 |

The above dry materials are uniformly and thoroughly mixed and an amount of clean fresh water corresponding to approximately 13½% by weight of the dry materials is added. Test panels and bars of this composition have shown an initial set in 2½ hours and a final set in 6 hours. The cold crushing strength of such specimens after a 24 hour curing in a damp atmosphere was 219 p. s. i. and after a 216 hour curing was 1169 p. s. i. The modulus of rupture after a 24 hour curing was 131 p. s. i. and after a 216 hour curing was 410 p. s. i. In general, the "green" strength compared favorably with concrete mixes including other cements. The molded density was 11.25 lbs. per straight, i. e. 192 lbs./cu. ft. and after firing to 3100 F. was 9.42 lbs. per straight, i. e. 160 lbs./cu. ft. The crushing strength after heating to 2500 F. was 2046 and the modulus of rupture was 1020 p. s. i. The crushing strength after heating to 3100 F. was 5608 p. s. i. and the modulus of rupture was 1162 p. s. i. The melting point could not be determined because of distillation of the chrome compounds at temperatures above 3150 F. A spalling test of 10 cycles at 2650 F. after reheat showed a loss of 5.8% which is within permissible limits.

The chrome castable mixture of this invention can not only be used at substantially higher temperatures than the plastic chrome ore of the prior art but can be used regularly and safely at temperatures up to 3100 F. which is a critical temperature zone rarely obtainable, if at all, by any other castable refractories. The relative merit of the various bonding agents when added to a chrome castable base of the preferred character indicated above is shown clearly in the following chart which compares three chrome base castables in which the only variant is the character of the bonding agent. The three bonding agents used are a commercial brand of Portland cement, $5CaO.3Al_2O_3$ cement, and the $3CaO.5Al_2O_3$ hydraulic cement. The linear and volumetric shrinkages of test straights after a five-hour soak at the designated temperatures were:

|  | 1000 F. | | 1500 F. | | 2000 F. | | 2500 F. | | 2600 F. | |
|---|---|---|---|---|---|---|---|---|---|---|
|  | ΔL | ΔV | ΔL | ΔV | ΔL | ΔV | ΔL | ΔV | ΔL | ΔV |
| Portland cement | 0.45 | 1.56 | 0.6 | 1.69 | 0.26 | 1.64 | 2.0 | 7.8 | 1.4 | 10.1 |
| $5CaO.3Al_2O_3$ | 0.40 | 2.13 | 0.4 | 1.78 | 0.29 | 0.32 | +0.8 | +2.1 | 0.0 | 1.7 |
| $3CaO.5Al_2O_3$ | 0.29 | 2.51 | 0.2 | 1.29 | 0.20 | 0.22 | 0.1 | 0.2 | +0.1 | 0.8 |

|  | 2700 F. | | 2800 F. | | 2900 F. | | 3000 F. | | 3100 F. | |
|---|---|---|---|---|---|---|---|---|---|---|
|  | ΔL | ΔV | ΔL | ΔV | ΔL | ΔV | ΔL | ΔV | ΔL | ΔV |
| Portland cement | 1.6 | 10.3 | | | | | | | | |
| $5CaO.3Al_2O_3$ | 0.7 | 4.6 | 1.5 | 7.3 | 1.9 | 8.8 | 2.6 | 11.1 | 2.6 | 13.1 |
| $3CaO.5Al_2O_3$ | 0.6 | 2.3 | 0.7 | 3.0 | 0.6 | 3.1 | 0.8 | 3.2 | 1.0 | 5.5 |

As can readily be seen from the above shrinkage chart in which ΔL shows the amount of linear shrinkage and ΔV the volumetric shrinkage, the refractory mix in which Portland cement was used as a bonding agent is very definitely inferior at practically all temperatures to the other two in which a calcium aluminate cement was used. The shrinkage values exhibited by the Portland cement bonded material at 2600 F. were so high that the product can be said to have failed at this point, whereas the amount of shrinkage of the $3CaO.5Al_2O_3$ bonded refractory at 3100 F. is approximately ⅓ less linearly and almost ½ less volumetrically. The chart also clearly shows the superiority of the $3CaO.5Al_2O_3$ bonded mix over the $5CaO.3Al_2O_3$ cement bonded mix throughout the test temperature range. With such shrinkage values, the permissible use limit of the $5CaO.3Al_2O_3$ cement bonded mix would be approximately 3000 F. and that of the $3CaO.5Al_2O_3$ bonded mix approximately 3100 F. Volumetric stability is thus attained without the necessity of pre-sintering the base mixture.

Furthermore, the chrome castable mixtures of this invention are much easier to handle than the plastic chrome ores heretofore in use, both from a view point of ease of application and the degree of care needed in order to make a satisfactory job. As has been previously indicated, these new mixtures can be used at a consistency permitting them to be troweled on or cast against forms and need not be so stiff as to require ramming or pounding into place. Furthermore, moisture pick-up by the mixture instead of affecting it in a deleterious manner may even be said to improve its properties.

We claim:

1. A dry unfired refractory mix adapted for use in a castable consistency by the addition and mixing of water therewith to form when set a highly refractory slag-resistant concrete, which comprises by weight 50-90% of a dry pulverized chrome ore containing more than 30% $Cr_2O_3$, 5-25% of a finely divided corundum-forming material from the group fused alumina, calcined alumina, gibbsite, diaspore, or bauxite, 5-20% of tri-calcium penta-aluminate hydraulic cement free from iron oxides, and up to 5% of plastic refractory clay.

2. A dry unfired refractory mix adapted for use in a castable consistency by the addition and mixing of water therewith to form when set a highly refractory slag-resistant concrete, which comprises by weight 50-90% of a dry pulverized raw chrome ore containing low melting point impurities and more than 40% $Cr_2O_3$, 5-25% of a finely divided corundum-forming material from the group fused alumina, calcined alumina, gibbsite, diaspore, or bauxite adapted to combine with said low melting point impurities, and 5-20% of tri-calcium penta-aluminate hydraulic cement free from iron oxides.

3. A dry unfired refractory mix adapted for use in a castable consistency by the addition and mixing of water therewith to form when set a highly refractory slag-resistant concrete, which comprises by weight 50-90% of a dry pulverized raw chrome ore containing low melting point impurities and more than 40% $Cr_2O_3$, 5-25% of a finely divided corundum-forming material from the group fused alumina, calcined alumina, gibbsite, diaspore, or bauxite adapted to combine with said low melting point impurities, 5-20% of tri-calcium penta-aluminate hydraulic cement free from iron oxides, and up to 5% of plastic refractory clay.

4. A dry unfired refractory mix adapted for use in a castable consistency by the addition and mixing of water therewith to form when set a highly refractory slag-resistant concrete, which comprises by weight approximately 72% of a dry pulverized raw chrome ore containing low melting point impurities and more than 40% $Cr_2O_3$, 15% of a finely divided corundum-forming material from the group fused alumina, calcined alumina, gibbsite, diaspore, or bauxite adapted to combine with said low melting point impurities, and 10% of tri-calcium penta-aluminate hydraulic cement free from iron oxides.

5. A dry unfired refractory mix adapted for use in a castable consistency by the addition and mixing of water therewith to form when set a highly refractory slag-resistant concrete, which comprises by weight approximately 57% of 4-6 mesh and 15% of 100 mesh of a dry pulverized raw chrome ore containing low melting point impurities and more than 40% $Cr_2O_3$, 15% of a 65 mesh finely divided corundum-forming material from the group fused alumina, calcined alumina, gibbsite, diaspore, or bauxite adapted to combine with said low melting point impurities, 10% of tri-calcium penta-aluminate hydraulic cement free from iron oxides, and the balance substantially all plastic refractory clay.

CHARLES L. NORTON, Jr.
VICTOR J. DUPLIN, Jr.

REFERENCES CITED

The following references are of record in the file of this patent:

UNITED STATES PATENTS

| Number | Name | Date |
|---|---|---|
| 852,908 | Sakurai | May 7, 1907 |
| 1,780,114 | Bronn | Oct. 28, 1930 |
| 2,051,002 | Knote | Aug. 11, 1936 |
| 2,246,226 | Walton | June 17, 1941 |